(12) United States Patent
VanKrevelen (10) Patent No.: US 6,799,239 B2
(45) Date of Patent: Sep. 28, 2004

(54) CENTRALLY DISTRIBUTED SERIAL BUS

(75) Inventor: Christopher J. VanKrevelen, Coon Rapids, MN (US)

(73) Assignee: Storage Technology Corporation, Louisville, CO (US)

( * ) Notice: Subject to any disclaimer, the term of this patent is extended or adjusted under 35 U.S.C. 154(b) by 527 days.

(21) Appl. No.: 10/037,589

(22) Filed: Oct. 23, 2001

(65) Prior Publication Data

US 2003/0088725 A1 May 8, 2003

(51) Int. Cl.$^7$ ............................ G06F 13/14; G06F 13/00
(52) U.S. Cl. ........................ 710/305; 710/100; 710/316
(58) Field of Search .............................. 710/100, 305, 710/316–317, 38

(56) References Cited

U.S. PATENT DOCUMENTS

2001/0014925 A1 * 8/2001 Kumata ...................... 710/101

* cited by examiner

Primary Examiner—Sumati Lefkowitz
(74) Attorney, Agent, or Firm—Brooks Kushman P.C.

(57) ABSTRACT

A bus for a computer system receives serial data from each subsystem and simultaneously broadcasts the data to all subsystems. The computer system includes bus interface logic in each subsystem. Each of a plurality of serial output paths carries serial data to one of the subsystems. Each of a plurality of serial input paths carries serial data from one of the subsystems. Communication interconnection logic receives data from bus interface logic through a corresponding serial input path. The received input data is buffered if the serial output paths are in use. When serial output paths are available, received data is simultaneously transmitted to each bus interface logic through all serial output paths.

15 Claims, 7 Drawing Sheets

CENTRALLY DISTRIBUTED SERIAL BUS

BACKGROUND OF THE INVENTION

1. Field of the Invention

The present invention relates to buses for interconnecting computer subsystems.

2. Background Art

Computer systems typically include one or more buses to permit communication between interconnected subsystems. One common type of subsystem interconnect is the parallel bus. Corresponding lines from each subsystem are connected together by cables or a backplane. Typically a bus master resolves contentions for access to the bus. Once a subsystem is granted access to the bus, the subsystem broadcasts information to all other subsystems in parallel. Parallel buses provide a rapid and efficient means for communicating information between subsystems. However, the entire bus may function incorrectly due to certain types of faults in a single subsystem. Further, bus contention and conflict may result in latency seen by a transmitting subsystem.

A second type of bus system interconnects each subsystem in a sequential or daisy chain fashion. Typically, such daisy chaining uses a high speed serial interconnect between logically adjacent subsystems. Information is transmitted from subsystem to subsystem along the daisy chain until it reaches the destination subsystem. Daisy chained buses typically experience long latencies as compared to parallel buses. Also, hot swapping or a fault in one subsystem may brake the chain rendering the bus inoperative.

What is needed is a subsystem interconnect that delivers information at high speed simultaneously to each subsystem. Further, the subsystem interconnect should be capable of surviving any fault within one or more subsystems.

SUMMARY OF THE INVENTION

The present invention receives data from each subsystem and simultaneously broadcasts the data to all subsystems. Thus, the present invention eliminates inter-subsystem latency. The present system is also tolerant of subsystem faults and hot swapping.

A computer system having a plurality of subsystems is provided. The computer system includes bus interface logic in each subsystem. The bus interface logic converts data from the subsystem into serial format for transmission and converts serial data received into a format usable by the subsystem. Each of a plurality of serial output paths carries serial data to one of the subsystems. Each of a plurality of serial input paths carries serial data from one of the subsystems. Communication interconnection logic receives data from bus interface logic through a corresponding serial input path. The received input data is buffered if the serial output paths are in use. Received data is simultaneously transmitted to each bus interface logic through all serial output paths.

In an embodiment of the present invention, bus interface logic includes a portion of the communication interconnection logic.

In another embodiment of the present invention, the communication interconnection logic includes a buffer associated with each serial input path for buffering received input data.

In yet another embodiment of the present invention, the communication interconnection logic monitors each serial input path and determines whether or not data on any path is faulty. Faulty data is not transmitted out to each bus interface logic.

In still another embodiment of the present invention, the communication interconnection logic determines the status of each bus interface logic by monitoring the serial input paths.

In a further embodiment of the present invention, each subsystem is implemented on a separate board within the computer system.

A method of interconnecting subsystems in a computer system is also provided. Serial data is transmitted from at least one subsystem to communication interconnection logic. The transmitted data is buffered in the communication interconnection logic if output serial paths to each subsystem are in use. The serial data is simultaneously transmitted from the communication interconnection logic to each subsystem when the output serial paths are not in use.

In an embodiment of the present invention, at least one subsystem supports a plurality of communication channels. Serial data is received by bus interface logic on the subsystem from at least one communication channel supported by the subsystem. The received serial data is buffered if an input serial path from the subsystem to the communication interconnection logic is in use. The received communication channel data is sent to the communication interconnection logic if the input serial path from the subsystem to the communication interconnection logic is not in use. Serial data is received on the output serial path from the communication interconnection logic to the subsystem. The received serial data is simultaneously transmitted on the output serial path to each communication channel of the subsystem.

An interconnection network interconnecting a plurality of computer components is also provided. The interconnection network includes a plurality of boards. Each board communicates with at least one computer component through a communication channel. Each board has bus interface logic for sending and receiving interconnection network commands. A data interconnect network establishes at least one data path between the boards. Each of a plurality of serial output paths carries serial commands to one of the boards. Each of a plurality of serial input paths carries serial commands from one of the boards. Communication interconnection logic receives serial commands from bus interface logic through a corresponding serial path. The received input commands are buffered if the serial output paths are in use. All received commands are transmitted to each bus interface logic through corresponding serial output paths. The communication interconnection logic controls the data interconnection network to establish at least one connection between the boards.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
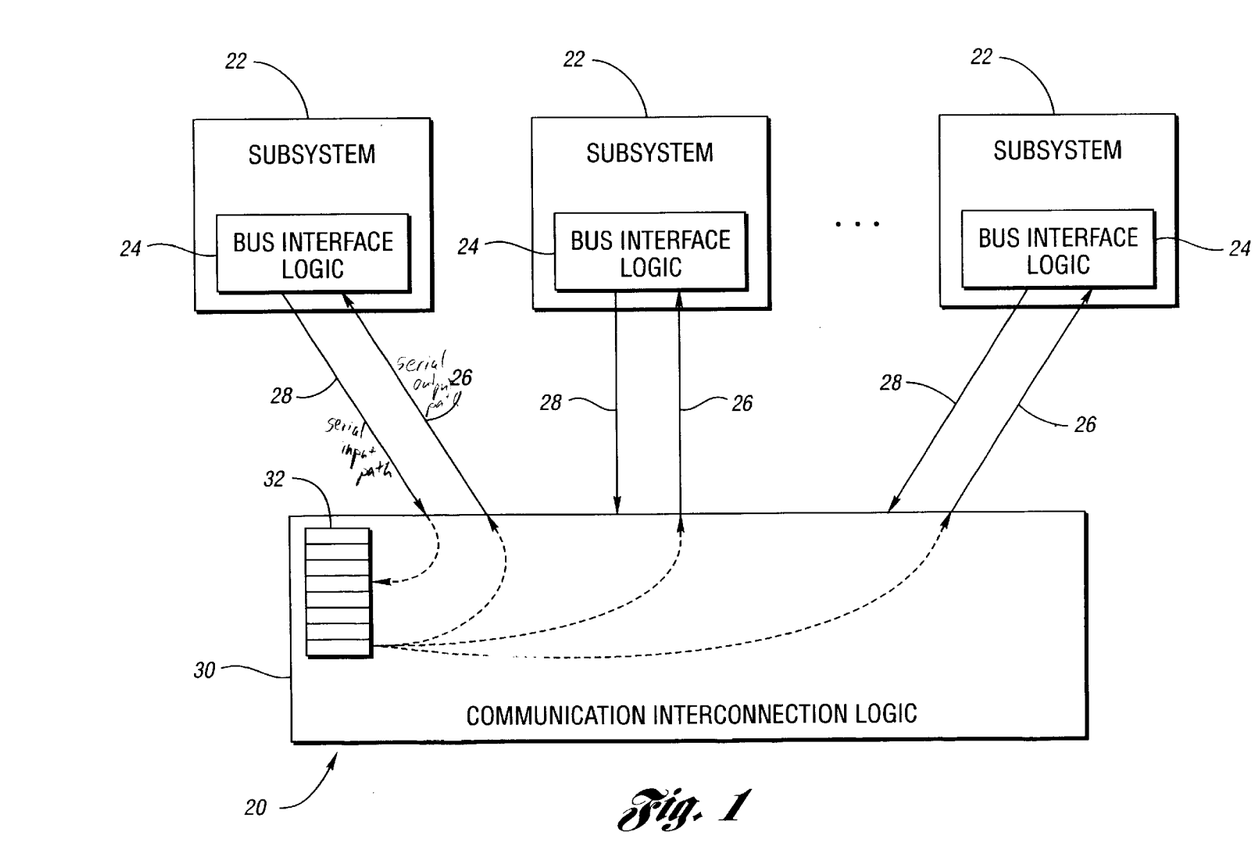
FIG. 1 is a block diagram illustrating a computer subsystem interconnection bus according to an embodiment of the present invention.

Referring to FIG. 1, a block diagram illustrating a computer subsystem interconnection bus according to an embodiment of the present invention is shown. A computer system, shown generally by 20, includes a plurality of subsystems 22. Subsystems may include processing elements and data storage elements, for example. Each subsystem 22 includes bus interface logic 24 converting data from the subsystem into serial format for transmission and converting serial data received into a format usable by subsystem 22. Computer system 20 includes serial output paths 26. Each serial output path 26 carries serial data to bus interface logic 24 in one subsystem 22. Computer system 20 also includes serial input paths 28. Each serial input path 28 carries serial data from bus interface logic 24 in one subsystem 22.

Computer system 20 includes communication interconnection logic 30 connected to each serial output path 26 and each serial input path 28. Communication interconnection logic 30 receives serial data on any serial input path 28 and sends the serial data to each bus interface logic 24 simultaneously over serial output paths 26. If output paths 26 are busy, received serial data is held in queue 32. Thus, each subsystem 22 simultaneously receives data sent by any other subsystem 22. Access to output paths 26 is fairly arbitrated by first-in first-out (FIFO) queue 32.

Communication interconnection logic 30 monitors data arriving on each serial input path 28. If faulty data is received, the data is not forwarded over output paths 26. Thus, any fault within subsystem 22 is easily isolated from the remainder of computer system 20 by not forwarding data received on serial input path 28 to the remaining subsystems 22. Further, subsystems 22 are hot swappable, permitting replacement of any subsystem 22 without affecting the remainder of computer system 20.

Figure 2:
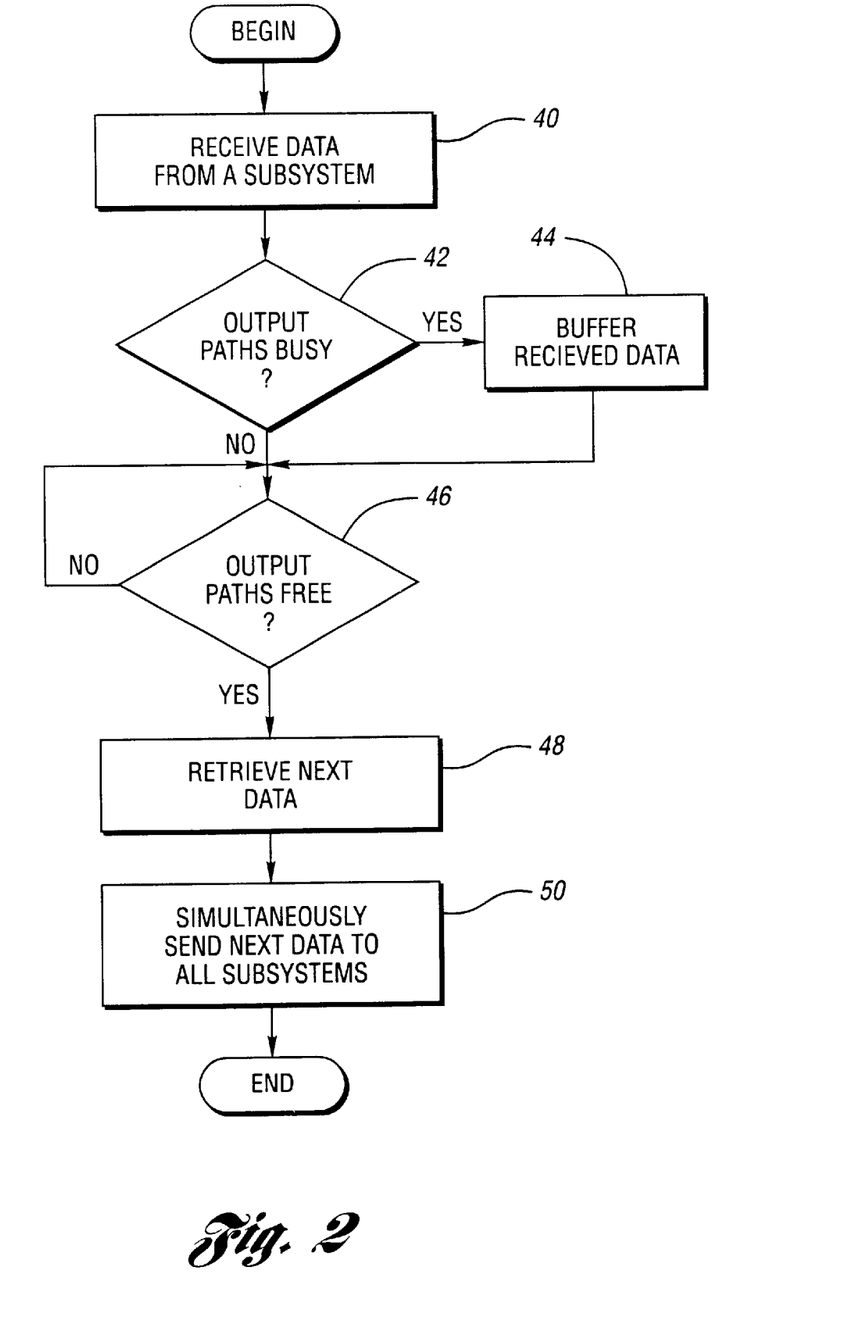
FIG. 2 is a flow diagram illustrating operation of a computer subsystem interconnect according to an embodiment of the present invention.

Referring now to FIG. 2, a flow diagram illustrating an operation of a computer subsystem interconnect according to an embodiment of the present invention is shown. As will be appreciated by one of ordinary skill in the art, the operations illustrated are not necessarily sequential operations. Further, operations may be implemented by software, hardware, or a combination of both. The present invention transcends any particular implementation and aspects are shown in sequential flow chart form for ease of illustration.

Data is received from a subsystem, as in block 40. Subsystem 22 sends data through bus interface logic 24 using serial input paths 28. Communication interconnection logic 30 receives the data from subsystem 22.

A check is made to determine if output paths are busy, as in block 42. Communication interconnection logic 30 determines if output paths 26 are currently transmitting data. If so, received data is buffered as in block 44. For example, communication interconnection logic 30 may place data received on serial input path 28 into queue 32.

A check is made to determine when output paths are free, as in block 46. When output paths 26 have finished transmitting a data element the next data element is retrieved, as in block 48. Communication interconnection logic 30 retrieves the next data element from queue 32.

Data is simultaneously sent to all subsystems, as in block 50. Communication interconnection logic 30 simultaneously sends the data to bus interface logic 24 in each subsystem 22 over serial output paths 26.

Figure 3:
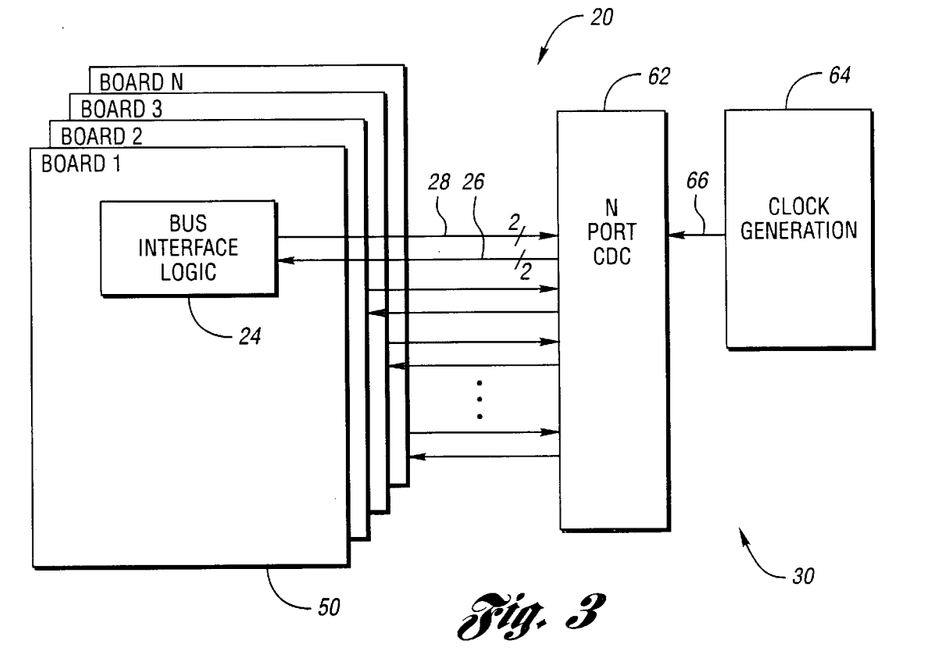
FIG. 3 is a block diagram illustrating serial bus interconnectivity according to an embodiment of the present invention.

Referring now to FIG. 3, a block diagram illustrating serial bus interconnectivity according to an embodiment of the present invention is shown. Typically, computer system 20 is implemented on a plurality of boards 50. Subsystem 22 may be supported by or built onto one or more boards 50. Also, board 50 may support more than one subsystem 22. As will be recognized by one of ordinary skill in the art, the present invention does not depend on the specific implementation of computer system 20 or of subsystems 22.

In FIG. 3, each board 50 includes bus interface logic 24. Serial output path 26 and serial input path 28 connect each board 50 with communication interconnection logic 30. Communication interconnection logic 30 is shown implemented as an N-port central distribution chip (CDC) 62 and clock generator 64 generating clock 66 for CDC 62.

Serial outputs 26 and serial inputs 28 may be implemented using a variety of constructions. For example, source synchronous signaling may be used. In this scheme, each link 26, 28 includes a serial data line and a clock line. Such a scheme may be implemented using low voltage differential signaling (LVDS) as is known in the art. Other serial transmission links are possible. For example, 8$b$/10$b$ encoding with built in clocking such as is used with Fibre Channel may be used for each serial link 26, 28.

Figure 4:
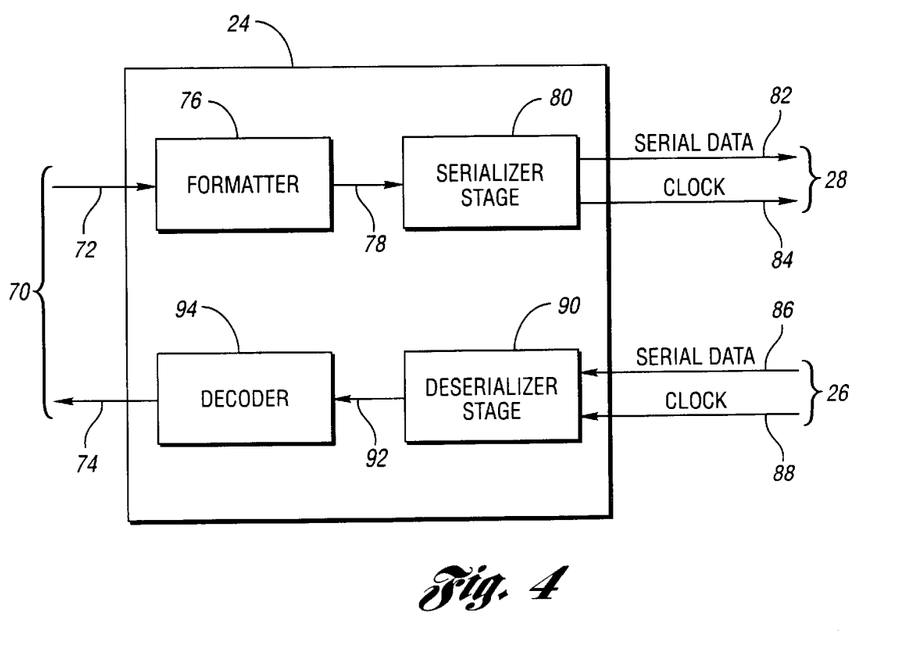
FIG. 4 is a block diagram illustrating bus interface logic according to an embodiment of the present invention.

Referring now to FIG. 4, a block diagram illustrating bus interface logic according to an embodiment of the present invention is shown. Bus interface logic 24 interfaces with subsystem 22 through communication link 70 which typically includes communication input 72 and communication output 74. Typically, communication input 72 and communication output 74 comprise parallel communication paths. Data received over communication input 72 is formatted in formatter 76. Formatting may include addition of error detection bits, addition of error correction bits, addition of communication signaling bits, encryption, and the like. Formatted data 78 is delivered to serializer 80 which comprises a shift register for sending formatted data 78 one bit at a time over serial data line 82 synchronized with a clock signal provided over clock line 84.

The reverse process is performed on data received over serial output path 26. Serial data line 86 and synchronous clock line 88 send signals to deserializer 90 which comprises a shift register for converting serial data to a parallel format. Formatted data 92 is sent from deserializer 90 to decoder 94. Decoder 94 removes excess bits and performs operations such as decrypting, error detecting, error correcting and the like. Received data is then provided at communication output 74.

Figure 5:
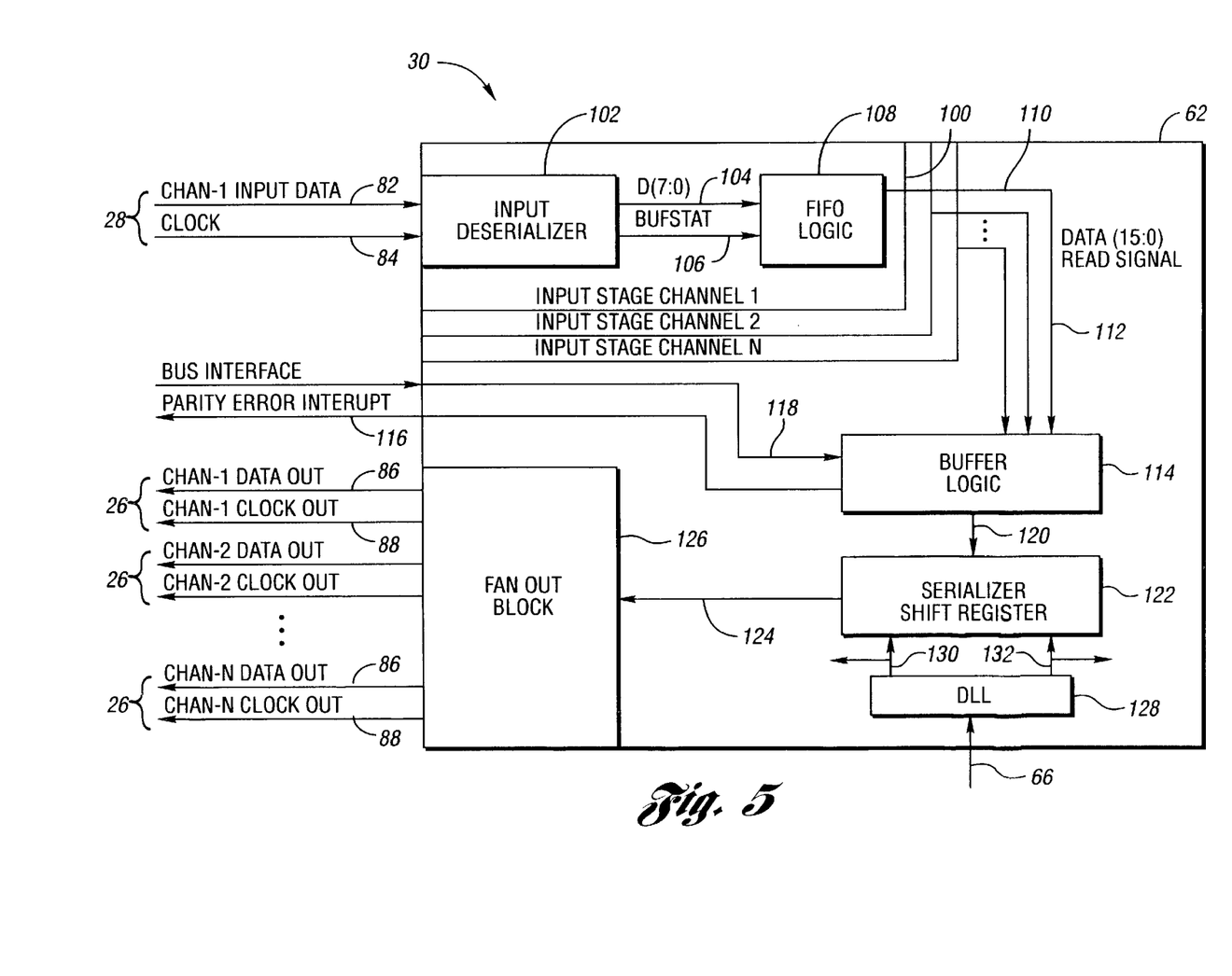
FIG. 5 is a block diagram illustrating communication interconnection logic according to an embodiment of the present invention.

Referring now to FIG. 5, a block diagram illustrating communication interconnection logic according to an embodiment of the present invention is shown. Communication interconnection logic as shown supports N instances of bus interface logic 24. Thus, communication interconnection logic 30 accepts N serial input paths 28 and generates data for N serial output paths 26. Associated with each serial input path 28 is input stage 100, one of which is shown. Input stage 100 accepts serial data line 82 and clock line 84 carrying data from bus interface logic 24. Input deserializer 102 includes a shift register converting serial input data into parallel data 104. Input deserializer 102 generates buffer ready signal (BUFSTAT) 106 when data 104 is valid. FIFO logic 108 may combine data 104 to produce parallel data 110. When data is ready to be sent, FIFO logic 108 generates read signal 112. FIFO logic 108 may also contain a first in first out queue for holding data 110.

Buffer logic 114 accepts data 110 and read signal 112 from each of the N input stages 100. Buffer logic 114 acknowledges read signal 112 and reads data 110. In one embodiment of the present invention, buffer logic 114 includes queue 32 accepting data 110 on a first come first served basis. In another embodiment of the present invention, buffer logic 114 merely buffers read signal requests 112 and reads in data 110 from FIFO logic 108 as needed. This allows buffer logic 114 to implement a wide variety of bus grant schemes.

Buffer logic 114 examines data 110 and generates data error signal 116 if an uncorrectable fault is detected. If such a fault occurs, buffer logic 114 discards faulty data 110. Buffer logic 114 may also generate and receive additional interface signals 118 as will be described below.

Buffer logic 114 generates buffer data 120 which is received by serializer 122. Serializer 122 includes a shift register converting parallel buffer data 120 into serial data 124. Serial data 124 is provided to fan out circuit 126 which simultaneously delivers serial data 124 to all serial output paths 26.

Preferably, communication interconnection logic 30 described above is contained within CDC 62. CDC 62 may be implemented as a custom integrated circuit chip, programmable logic, microprocessor, discrete logic, any combination of these, and the like. Preferably, CDC 62 includes control logic 128 accepting clock 66 and generating timing signals 130 and control signals 132 for the various elements of CDC 62.

Figure 6:
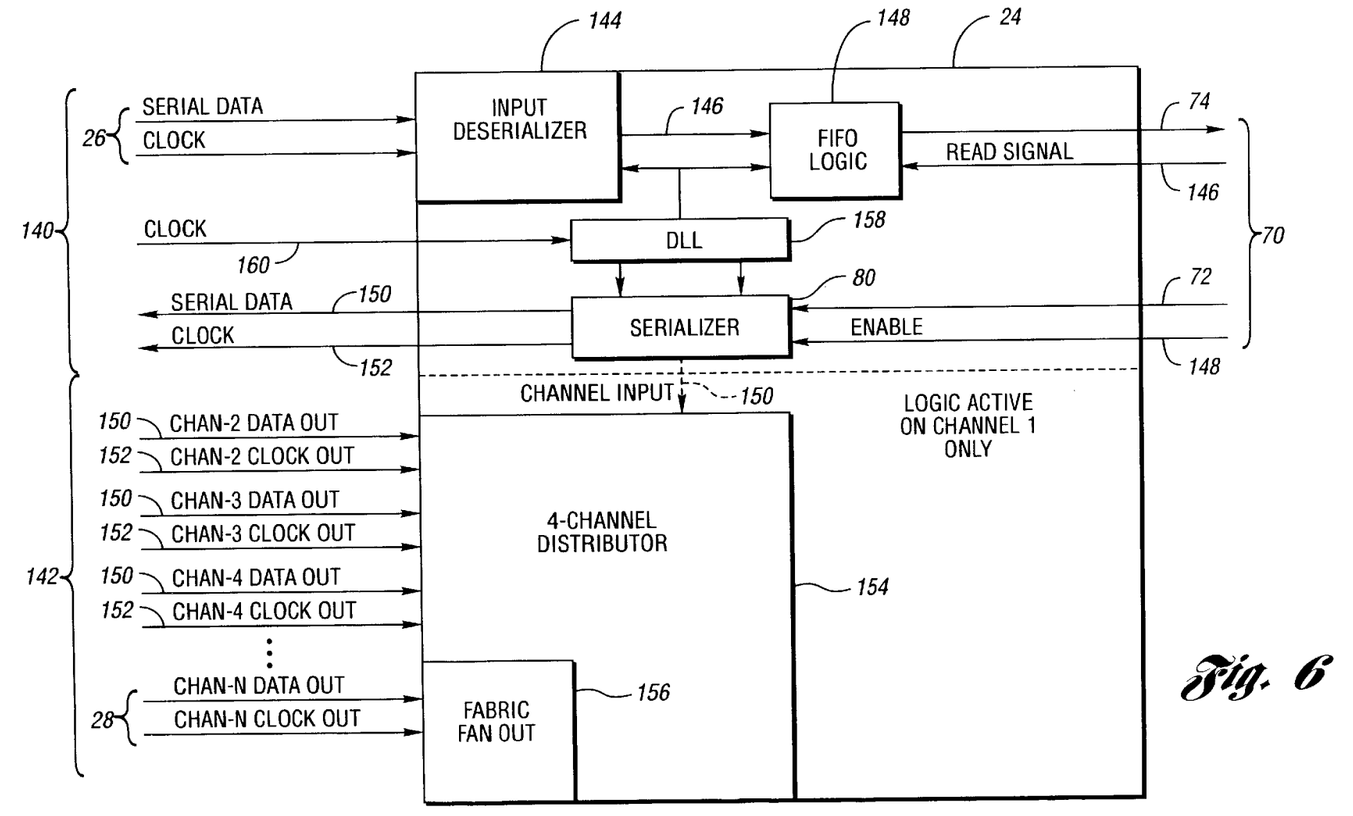
FIG. 6 is a block diagram illustrating bus interface logic including distributed communication interconnection logic for supporting multiple channels according to an embodiment of the present invention.

Referring now to FIG. 6, a block diagram illustrating bus interface logic including distributed communication interconnection logic for supporting multiple channels according to an embodiment of the present invention is shown. The example illustrated in FIG. 6 distributes a portion of communication interconnection logic 30 to permit bus interface logic 24 to support four ports or channels. Each channel has a substantially identical port portion 140 and the four channels share communication portion 142 which, for the sake of example, will be described as being attached to port portion 140 for channel 1.

Port portion 140 accepts data from CDC 62 transmitted through serial output path 26 at input deserializer 144. Input deserializer 144 includes a shift register producing parallel data 146 for FIFO logic 148. FIFO logic 148 operates in a manner similar to FIFO logic 108 in CDC 62. FIFO logic may also include logic for error detection, error correction, decryption and the like. FIFO logic 148 produces communication output 74 in response to read signal 146.

Data to be transmitted arrives on communication input 72 latched by enable signal 148 into serializer 80. In this example, data formatting may be performed by serializer 80 or by subsystem 22. Serializer 80 includes a shift register for generating serial data 150 synchronized by clock 152. For channels 2–4, serial data 150 and clock 152 are transmitted to communication portion 142 on channel 1.

Communication portion 142 implements distributor 154 which functions as a four channel CDC 62 except that fan out block 156 generates a single serial link output, serial input path 28. In the implementation described below, fan out 156 generates two identical serial input paths 28 for redundancy.

Bus interface logic 24 may be implemented in a variety of means such as a custom integrated circuit chip, programmable logic, microprocessor, discrete logic, a combination of these, and the like. Port portions 140 may be separate devices or combined with communication portion 142. Preferably, bus interface logic 24 includes control logic 158 accepting clock signal 160 and generating various timing and control signals as is known in the art.

Figure 7:
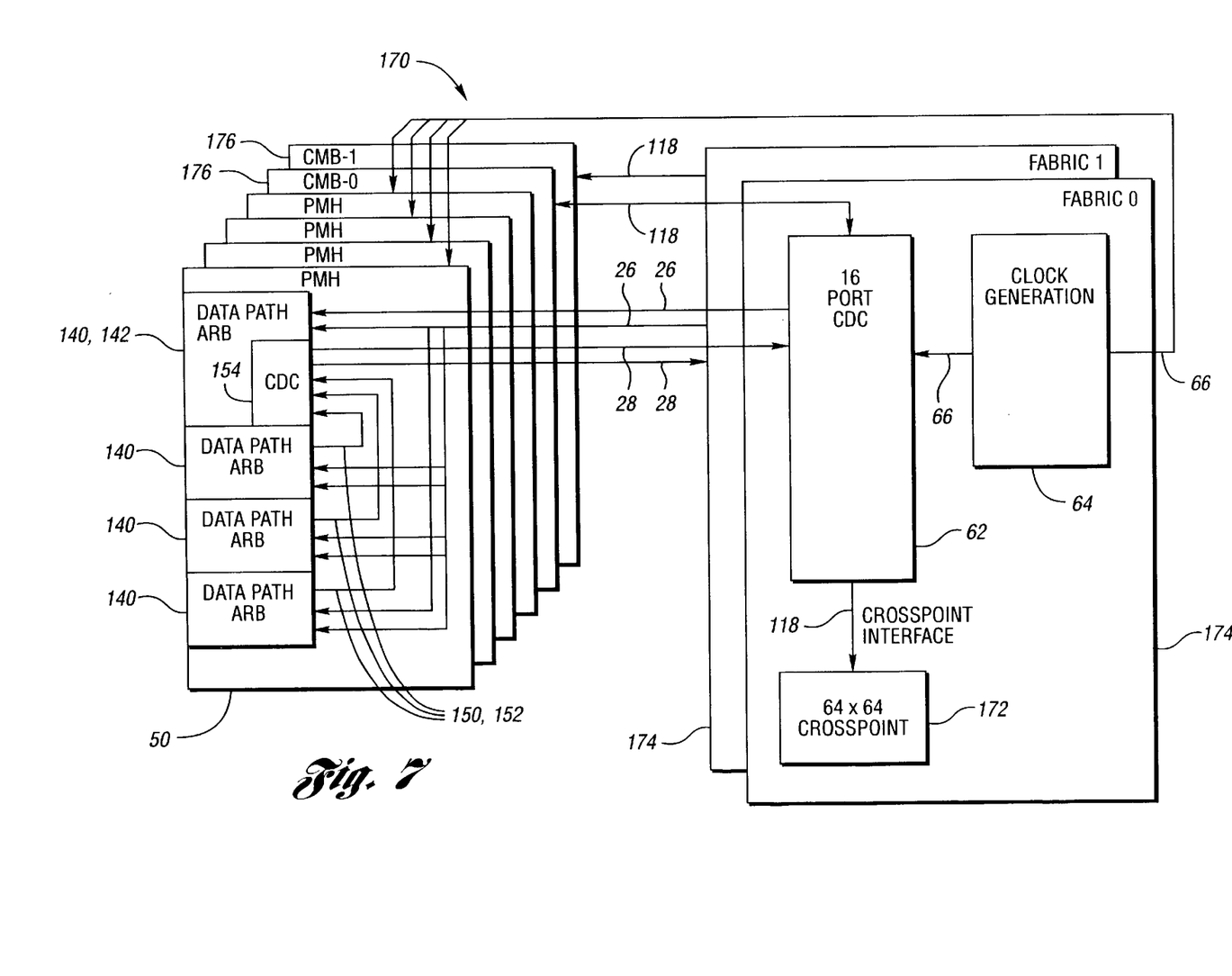
FIG. 7 is a block diagram illustrating an interconnection network according to an embodiment of the present invention.

Referring now to FIG. 7, a block diagram illustrating an interconnection network according to an embodiment of the present invention is shown. In this embodiment, the serial Adata@ bus is used to transmit commands for establishing, maintaining and tearing down data paths between computer components. Computer system 20 includes interconnection network 170 for interconnecting subsystems 22. Interconnection network 170 includes boards 50, each of which communicates with at least one of the computer component through a communication channel not shown. A data interconnect network, shown here by 64H64 crosspoint switch 172, can establish at least one path between each board 50. Serial output paths 26 and serial input paths 28, linking boards 50 with CDC 62, carry the commands. CDC 62 supports 16 channels and each board 50 includes bus interface logic 24 supporting four channels. Hence, communication interconnection logic 30 functions to distribute commands to 64 channels 70.

CDC 62, clock generator 64 and crosspoint switch 172 together make up switching fabric 174. Interconnection network 170 contains two switching fabrics 174 for redundancy. Each switching fabric 174 is connected to each board 50. Thus if one switching fabric 174 fails, the second switching fabric 174 can be immediately brought on line. Interconnection network 170 also includes redundant command boards 176 for monitoring the operation of interconnection network 170 and for providing a user interface.

Figure 8:
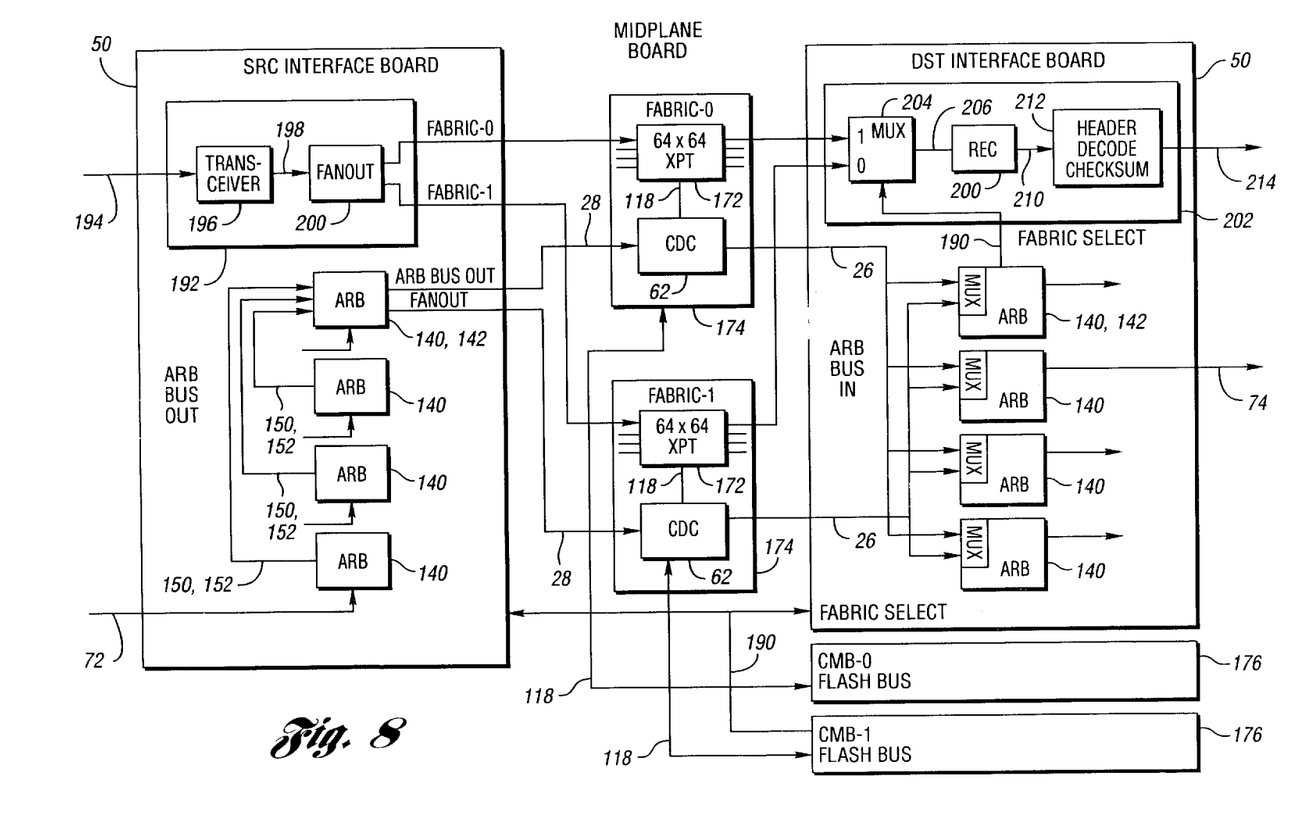
FIG. 8 is a block diagram illustrating redundant data paths according to an embodiment of the present invention.

Referring now to FIG. 8, a block diagram illustrating redundant data paths according to an embodiment of the present invention is shown. For the purpose of explanation, one board 50 has been designated as the source of data (SRC) and one board 50 as the destination (DST). A component served by SRC board 50 wishing to communicate with a component serviced by DST board 50 first generates a request command on communication input 72 including the port address on DST board 50 for the desired component. The command is transmitted over serial input path 28 to CDC 62 on each switching fabric 174. Only one switching fabric 174 is active, as indicated by fabric select 190 supplied by one or both command boards 176. Active CDC 62 then broadcasts the connection request command simultaneously to every port on every board 50 including DST board 50.

Port portion 140 on each board 50 includes a multiplexor for selecting between serial output paths 26 from each switching fabric 174 based on fabric select 190. Each port portion 140 forwards the connection request command to the supported computer component on corresponding communication output 74. If the addressed component desires to establish a communication channel with the requesting component, and acceptance command is broadcast to each board 50 in a similar fashion. Buffer logic 114 in CDC 62 recognizes the acceptance command and outputs interface signal 118 to crosspoint switch 172, thus establishing a data path between SRC board 50 and DST board 50.

Each board 50 includes one set of data transmit logic 192 for each port. Thus, SRC board 50 includes four data transmit logics 192, one of which is shown. Data 194 from supported transmitting computer component is received by transceiver 196 which converts the data to a serial format. Serial data 198 is sent by fanout logic 200 to crosspoint switch 172 on each switching fabric 174.

Each board 50 includes data reception logic 202 for each port. Thus, DST board 50 includes four sets of data reception logic 202, one of which is shown. Multiplexor 204 selects between cross point switches 172 in each switching fabric 174 based on fabric select 190. Selected signal 206 is provided to receiver 208 for converting into parallel data 210. Parallel data 210 may be further processed by conversion logic 212 for error detection, error correction, decryption, and the like. Appropriately formatted data 214 is provided to the destination computer component.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A computer system having a plurality of subsystems, each subsystem operative to communicate with at least one other subsystem, the computer system comprising:
    bus interface logic in each subsystem, the bus interface logic converting data from the subsystem into serial format for transmission and converting serial data received into a format usable by the subsystem;
    a plurality of serial output paths, each serial output path carrying serial data to one of the subsystems;
    a plurality of serial input paths, each serial input path carrying serial data from one of the subsystems; and
    communication interconnection logic connected to each serial output path and to each serial input path, the communication interconnection logic operative to
        (a) receive data from bus interface logic through a corresponding serial input path,
        (b) buffer the received input data only if the serial output paths are in use, and
        (c) simultaneously transmit received data to each bus interface logic through all serial output paths.

2. A computer system as in claim 1 wherein each subsystem supports a plurality of communication channels, each bus interface logic further comprising a portion of the communication interconnection logic.

3. A computer system as in claim 1 wherein the communication interconnection logic comprises a buffer associated with each serial input path for buffering received input data.

4. A computer system as in claim 1 wherein the communication interconnection logic is further operative to:
    monitor each serial input path;
    determine that data on any path is faulty; and
    not transmit faulty data to each bus interface logic.

5. A computer system as in claim 1 wherein the communication interconnection logic is further operative to determine the status of each bus interface logic by monitoring the serial input paths.

6. A computer system as in claim 1 wherein each subsystem is implemented on a separate board within the computer system.

7. A method of interconnecting a plurality of subsystems in a computer system, the method comprising:
    transmitting serial data from at least one subsystem to communication interconnection logic;
    buffering the transmitted data in the communication interconnection logic only if output serial paths to each subsystem are in use; and
    simultaneously transmitting the serial data from the communication interconnection logic to each subsystem when the output serial paths are not in use.

8. A method of interconnecting a plurality of subsystems in a computer system as in claim 7 wherein at least one subsystem supports a plurality of communication channels, the method further comprising:
    receiving serial data in bus interface logic on the subsystem from at least one communication channel supported by the subsystem;
    buffering the received serial data if an input serial path from the subsystem to the communication interconnection logic is in use;
    sending the received communication channel data to the communication interconnection logic if the input serial path from the subsystem to the communication interconnection logic is not in use;
    receiving serial data on the output serial path from the communication interconnection logic to the subsystem; and
    simultaneously transmitting the serial data received on the output serial path to each communication channel of the subsystem.

9. A method of interconnecting a plurality of subsystems in a computer system as in claim 7 wherein buffering the transmitted data comprises buffering the data received from each input serial path in a buffer associated only with that input serial path.

10. A method of interconnecting a plurality of subsystems in a computer system as in claim 7 further comprising not transmitting serial data to each subsystem if the data is determined to be faulty.

11. A method of interconnecting a plurality of subsystems in a computer system as in claim 7 wherein each subsystem is implemented on a separate integrated circuit board.

12. An interconnection network interconnecting a plurality of computer components comprising:
    a plurality of boards, each board in communication with at least one computer component through a communication channel, each board having bus interface logic for sending and receiving interconnection network commands;
    a data interconnection network for establishing at least one data path between the plurality of boards;
    a plurality of serial output paths, each serial output path carrying serial commands to one of the boards;
    a plurality of serial input paths, each serial input path carrying serial commands from one of the boards; and
    communication interconnection logic interconnected to each serial output path and to each serial input path, the communication interconnection logic operative to
        (a) receive serial commands from bus interface logic through a corresponding serial input path,
        (b) buffer the received input commands only if the serial output paths are in use, (c) transmit all received commands to each bus interface logic through corresponding serial output paths, and (d) control the data interconnection network to establish at least one connection between boards.

13. An interconnection network as in claim 12 wherein each board supports a plurality of communication channels, each bus interface logic further comprising logic forwarding commands received from the communication channels to the communication interconnection logic and forwarding commands received from the communication interconnection logic to each channel.

14. An interconnection network as in claim 12 wherein the communication interconnection logic comprises a buffer associated with each serial input path for buffering received input commands.

15. An interconnection network as in claim 12 wherein the communication interconnection logic is further operative to:

monitor each serial input path;

determine that commands on any path are faulty; and not transmit faulty commands to each bus interface logic.

* * * * *